United States Patent [19]

Brainard II

[11] Patent Number: 4,865,210
[45] Date of Patent: Sep. 12, 1989

[54] PRESSURE VESSEL WITH IMPROVED EXTERNAL SEAL

[75] Inventor: Edward C. Brainard II, Marion, Mass.

[73] Assignee: Endeco Inc., Marion, Mass.

[21] Appl. No.: 288,820

[22] Filed: Dec. 23, 1988

[51] Int. Cl.$^4$ ............................................. B65D 41/24
[52] U.S. Cl. ...................................... 220/3; 53/419;
114/257; 206/497; 220/319
[58] Field of Search .................. 53/419; 114/256, 257,
114/321, 336, 341, 342; 206/0.6, 497, 524.8;
220/3, 66–68, 80, 319

[56] References Cited

U.S. PATENT DOCUMENTS

| | | |
|---|---|---|
| 2,547,521 | 4/1951 | Buehler . |
| 3,344,912 | 10/1967 | Sternau . |
| 3,358,902 | 12/1967 | Emmert et al. . |
| 3,381,842 | 5/1968 | Vayson . |
| 3,410,442 | 11/1968 | Vayson . |
| 3,598,275 | 8/1971 | Francois .............. 114/342 |
| 3,760,753 | 9/1973 | Mertens ................ 114/257 |
| 3,773,205 | 11/1973 | Keeler et al. .......... 206/497 |
| 3,873,018 | 3/1975 | Donnay ................ 206/497 |
| 3,997,056 | 12/1976 | Mueller ................ 206/497 |
| 4,018,904 | 4/1977 | Muraoka ............... 206/497 |
| 4,226,327 | 10/1980 | Ballard . |
| 4,252,244 | 2/1981 | Christian et al. . |
| 4,576,105 | 3/1986 | Erdmann et al. ....... 114/336 |

FOREIGN PATENT DOCUMENTS 2422673  12/1974  Fed. Rep. of Germany .......... 220/3

OTHER PUBLICATIONS

*Design News*, "Heat Shrinkable Tubing Protects Fiber Optic Cables", Dec. 7, 1987, p. 91.
*Design News*, "Composite Housings Tackle Deep-Sea Demons", Nov. 23, 1987, pp. 102 and 104.
*Materials Engineering*, "Nonmetallic News", Jan., 1976, p. 24.

*Primary Examiner*—Jimmy G. Foster
*Attorney, Agent, or Firm*—Young & Thompson

[57] ABSTRACT

A pressure vessel capable of withstanding elevated external hydrostatic pressures is provided, comprising a tubular casing capable of withstanding hydrostatic pressures having an internal cavity and at least one end opening permitting entry into the cavity. An end closure seals the end opening and defines an external joint between the closure and the pressure vessel casing upon sealing of the opening. The end closure has an outer circumferential surface which is coextensive, that is flush, with the adjacent circumferential surface of the pressure vessel casing. At least a portion of the pressure vessel casing and closure are encapsulated by a seamless tubular sleeve of heat or air-shrinkable material which covers the entire extent of the external joint and is heat or air-shrunk about the vessel to seal the external joint. There is a layer of sealant in the form of an adhesive or a mastic, between the shrunk sleeve and the vessel.

18 Claims, 1 Drawing Sheet

PRESSURE VESSEL WITH IMPROVED EXTERNAL SEAL

BACKGROUND OF THE PRESENT INVENTION

The present invention relates to a pressure vessel having an improved external seal for use under conditions of high hydrostatic pressure.

Instrument pressure vessels presently designed for oceanographic research under conditions of high hydrostatic pressure typically employ O-ring seals. Such seals are conventionally "piston" type or "compression" type seals. Such vessels have been employed to reach the deepest reaches of the oceans, such as the Marianas Trench which is 36,000 feet deep, and are as a result subjected to external hydrostatic pressures on the order of 18,000 psi. Even exposure to lesser ocean depths may subject the pressure vessel to hydrostatic pressures of at least 10,000 psi. It is thus critical that the opening in the vessel which permits access to the interior be sufficiently protected against the high pressures encountered and the effect of the surrounding water at such pressures. For example, water can wick into the interior of the pressure vessel through the joint between adjacent parts of the vessel if such joints are not properly protected.

Further, it is desirable to protect the material of which the pressure vessel is formed against the corrosive effects of sea water, especially in view of the fact that pressure vessels containing oceanographic research instruments often are in contact with sea water for extended periods of time.

Various types of pressure vessel configurations are known in the art as described by U.S. Pat. Nos. 2,547,521; 3,381,842; and 3,410,442, albeit for use in withstanding high internal pressures. The vessels described in these patents are tubular in configuration and include an end cap seated in an end opening of the vessel. Both end caps which are threadedly engaged with the vessel and circumferential collars can be employed to seal the joint between the end cap and the vessel. Since such vessels are adapted to withstand high internal versus external pressures, the manner by which the openings in the vessels are sealed would be unacceptable in an environment in which elevated external hydrostatic pressures are confronted.

U.S. Pat. No. 4,252,244 similarly is directed to a vessel adapted to withstand internal pressures. The patent discloses the use of successive shrinkable wraps which overlie an inner liner to assist the liner to withstand internal pressures. Such wraps are covered by an outer end cap. Such a vessel is also unacceptable for use in an elevated external hydrostatic pressure environment due to the number of exposed joints present on the exterior surface of the vessel.

U.S. Pat. Nos. 3,344,912; 3,358,902; and 4,226,327 each disclose the use of heat-shrinkable plastic materials to seal end portions of containers (e.g., food containers) or to provide an outer covering for a package. Of course, such disclosures bear little relevance to the sealing of a pressure vessel adapted for use under conditions of elevated hydrostatic pressure.

It is also known to employ heat-shrinkable tubing to provide a protective covering for various types of materials which are in contact with sea water, and especially are used to protect fiber-optic cables which are employed by the U.S. Navy in a manner which constantly exposes the cables to the effects of sea water. It is further known to employ pressure vessels comprised of composite materials such as fiber-reinforced plastics in an attempt to avoid the deleterious effect of sea water upon the metallic materials conventionally employed.

OBJECTS AND SUMMARY OF THE INVENTION

It is thus an object of the present invention to provide a pressure vessel having an improved seal between adjacent parts.

It is also an object of the present invention to provide a pressure vessel having enhanced ability to withstand the effect of water at high hydrostatic pressures.

It is further an object of the present invention to provide a simplified high pressure seal for a pressure vessel suitable for use in high hydrostatic pressure environments.

It is still further an object of the present invention to provide means to protect pressure vessels from the corrosive effects of sea water during long-term immersion in same.

It is yet further an object of the present invention to prevent the wicking of water along the longitudinal extent of synthetic fibers in synthetic fiber composite pressure vessels resulting in the leaking and weakening of the pressure vessel.

In accordance with the claimed invention, there is thus provided a pressure vessel capable of withstanding elevated external hydrostatic pressures, said pressure vessel comprising a tubular pressure vessel casing capable of withstanding extreme hydrostatic pressures having an internal cavity and an opening in at least one end permitting access to said cavity, closure means sealing said end opening and defining an external joint between adjacent portions of said closure means and said pressure vessel casing upon sealing of said opening, said closure means having an outer circumferential surface which is coextensive with an adjacent circumferential surface of said pressure vessel casing, at least a portion of said pressure vessel casing and said closure means being encapsulated by a seamless layer of heat or air-shrinkable material which covers the entire extent of said external joint and is heat or air-shrunk about said portions of said pressure vessel and said closure means.

DETAILED DESCRIPTION OF THE INVENTION

The present invention will be described in connection with FIGS. 1-8.

The casing 1 of the pressure vessel employed in the present invention may be comprised of any material conventionally employed to provide a pressure vessel capable of withstanding high hydrostatic pressures such as those encountered at extreme ocean depths. Such materials include but are not limited to synthetic resin materials such as polyvinyl chloride, metallic materials such as aluminum, stainless steel or titanium, or composite materials such as fiberglass/epoxy composites. The determination of suitable materials for use in the construction of the pressure vessel casing is well within the skill of the routineer in the art.

Figure 1:
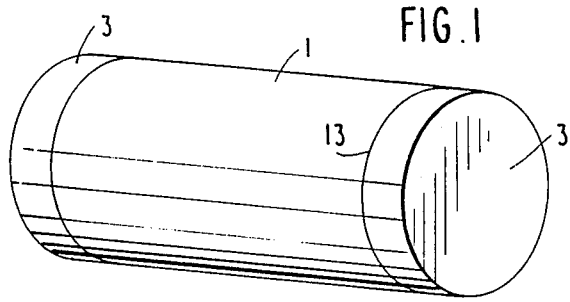
FIG. 1 is a view in perspective of a pressure vessel prior to being sealed in accordance with the present invention.

The pressure vessel casing 1 is tubular (e.g., cylindrical) in configuration, as depicted in FIG. 1. The particular tubular shape or configuration which is employed may be readily determined by one skilled in the art based on the intended use of the pressure vessel, the environment in which it will be employed and/or the type of material or instruments to be placed and protected within the pressure vessel. Depending upon the type of material employed, the wall thickness of such casings can range from about 0.1 to about 1.0 inch.

Irrespective of the specific shape or configuration of the pressure vessel which is employed, the pressure vessel casing 1 will include at least one end opening to permit access to the interior of the pressure vessel.

Closure means 3 is employed to seal the end opening to prevent access by surrounding water to the interior 5 of the pressure vessel at whatever depths are encountered. As shown in the Figures, openings in the end of tubular pressure vessel casings are conveniently sealed by end caps 3 having a circumferential surface coextensive, i.e., flush, with the adjacent circumferential surface of the pressure vessel casing so as to provide a substantially continuous surface along the exterior of the pressure vessel. In the preferred embodiment in which the pressure vessel is cylindrical, the outer peripheries of casing 1 and closure means 3 are concentric cylinders of identical diameter.

Opposing surfaces of the end cap and the pressure vessel casing should be machined flat and lie in planes perpendicular to the axis of the vessel, with no beveled edges at the outer periphery, thereby to minimize the width of the joint 13 (i.e., the space between the end cap and the pressure vessel casing). This minimizes hydrostatic extrusion into the joint by the heat or air-shrunk material discussed below which would serve to weaken the seal provided thereby.

The end cap 3 may be comprised of any suitable material deemed acceptable by one skilled in the art. For example, the end cap may be comprised of the same type of material as the pressure vessel casing or, in the alternative, a different material which exhibits a pressure rating and adaptability to the harsh environment to be encountered, which are at least as high as the material of which the pressure vessel casing is comprised. By way of further example, an aluminum pressure vessel casing desirably is used in conjunction with aluminum end caps. Aluminum end caps can also be employed with advantage in conjunction with composite fiberglass/epoxy pressure vessel casings. Polyvinyl chloride pressure vessels desirably are employed in conjunction with polyvinyl chloride end caps. Such combinations are provided by way of example only and are not intended to be limiting by nature. However, one advantage of the present invention is that dissimilar structural materials may be employed in construction of the pressure vessel without diminishing the effectiveness of the heat or air-shrunk seal.

However, experience has shown that pressure vessels comprised of resin-impregnated fibers can be forced to delaminate under extreme hydrostatic pressures due to water being forced radially inwardly. Contact of the surrounding water with the exposed ends of the fibers also permits the water to travel lengthwise along the fibers resulting in delamination. As a result, under extreme hydrostatic pressures, it is important to completely isolate such composite materials from the effect of the surrounding water by practice of the present invention. The complete sealing of the surface of an aluminum pressure vessel is also desirable to inhibit damage from corrosion, denting or abrasion.

The end cap 3 may be attached to the pressure vessel casing 1 by any suitable means known to those skilled in the art which manner of attachment is sufficient to satisfactorily seal the opening. Such attachment means include but are not limited to adhesive bonding and/or attachment by screw threads 9 or screws (not depicted).

The end cap may include a longitudinal extension 11 configured to extend into the end opening in the pressure vessel casing to permit the end cap 3 to be seated within the opening, thus assisting in the positioning of the end cap during the sealing of the opening in the pressure vessel casing.

However, irrespective of the shape or configuration of the pressure vessel as well as the type of closure means employed for sealing the opening in the pressure vessel casing, the fact remains that joints 13 are formed between adjacent surfaces of the closure means and the pressure vessel casing which joints need to protected against possible ingress of water at the extreme hydrostatic pressures which may be encountered during use.

It has been discovered that such joints 13 may be sealed with highly desirable results by use of a seamless layer of a heat or air-shrinkable material 7 which upon shrinking encapsulates at least those portions of the pressure vessel casing and the closure means adjacent the joint together with the entire circumferential extent of the joint itself.

Importantly, the layer 7 of heat or air-shrinkable material is seamless to enhance the ability of the material upon being heat or air- shrunk to conform to the configuration of the pressure vessel casing and the end cap while providing maximum protection of the joint between the two. As a result, the heat or air-shrinkable material will be employed in the form of a tubular sleeve which can be placed in encompassing relationship to the tubular pressure vessel casing and subsequently shrunk about the casing.

The thickness of the heat or air-shrinkable material which is employed will vary depending upon the contemplated environment of use for the pressure vessel. However, thicknesses in the range of from about 0.02 to about 0.20 inches have been found to be acceptable.

The types of heat or air-shrinkable materials which are suitable for use in the present invention are limited only by the long-term stability exhibited by such materials in the corrosive, high hydrostatic pressure environment contemplated. Such materials are well-known to those skilled in the art and such a person will be able to properly determine which heat or air-shrinkable materials are suitable.

Multiple types of heat-shrinkable materials are available which can h=employed in practice of the claimed invention including but not limited to radiation cross-linked heat-shrinkable polyolefin sleeves marketed by Sigmaform Corporation of Santa Clara, California which will shrink by approximately 33 percent at temperatures of about 125° C. Heat-shrinkable fluorocarbon-based materials are also known in the art and are available from Texloc Corporation. Such fluorocarbon sleeves include an outside surface of polytetrafluoroethylene which provides temperature resistance, chemical resistance, and water resistance.

Air-shrinkable materials may also be used with advantage and are also known to those skilled in the art. Such materials are initially expanded by means of an impregnating solvent with the material maintained in contact with the solvent until shrinkage of the material is desired. The material is then exposed to air to permit the solvent to evaporate, the material being caused to shrink upon removal of the solvent. Air-shrinkable materials have several advantages in relation to heat-shrinkable materials, including the ability to avoid the use of expensive heat-application machinery. Additionally, it is believed that a better sealing configuration is obtained by use of air-shrinkable materials since the shrinkage of such materials occurs substantially continually during exposure to air. By contrast, heat-shrinkable materials shrink only upon application of heat and cease to shrink when heat is no longer applied.

Exemplary air-shrinkable materials are presently marketed by Insulation Products, Inc. and include polyvinyl chloride, chlorosulfonated polyethylene, polychloroprene, polyurethane, silicone and EPDM-based materials. Polyurethane is desirable due to its high abrasion resistance and low water uptake. A constant compression fit of about 25 psi can be obtained with a polyurethane air-shrunk tubular sleeve. Polyvinyl chloride would also be desirable in an ocean environment. The respective solvents employed vary but include nonflammable halocarbons. One advantage of the use of air-shrinkable materials is the fact that sleeves comprised of same are generally available in larger diameters than those comprised of heat-shrinkable material.

While the heat or air-shrinkable material may be employed without benefit of adhesive bonding in conjunction with the sealing of the joint between the end cap and the pressure vessel casing, it is preferred to incorporate an adhesive layer 15 between the heat or air-shrunk material 7 and the exterior surface of the pressure vessel casing 1.

The type of adhesive employed will, of course, vary depending upon whether the material is a heat or air-shrinkable material. For instance, with a heat-shrinkable material, any suitable thermoplastic melt adhesive may be employed to assist in the bonding of the heat-shrunk material to the pressure vessel. Such melt adhesives are well-known to those skilled in the art and include by way of example ethyl-vinyl acetate. Such melt adhesives are advantageously employed in the form of a continuous thin film 15 several mils in thickness applied to the interior surface of the sleeve of heat-shrinkable material to be bonded to the pressure vessel. Alternatively, the melt adhesive may be employed in the form of a sheet wrapped about the pressure vessel prior to the pressure vessel being encompassed by the heat-shrinkable material. The melt adhesive preferably takes the form of a separate sleeve placed over the pressure vessel prior to application of the heat-shrinkable layer which sleeve may range up to about 20–30 mils in thickness.

With regard to adhesives suitable for use with air-shrinkable materials, various known sheet-mastic adhesives which are reactive with the air-shrinkable material while serving to bond the same to the pressure vessel are suitable, which adhesives do not require the application of heat for activation.

Figure 3:
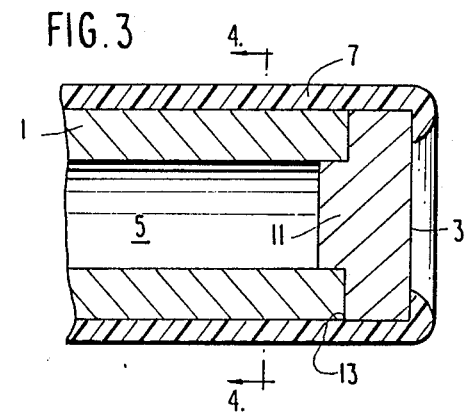
FIG. 3 is a view in longitudinal cross-section of the pressure vessel of FIG. 2.
Figure 2:
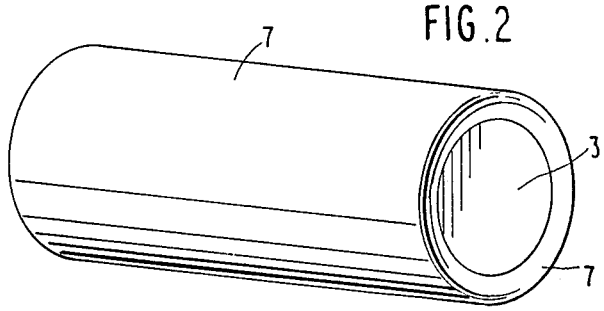
FIG. 2 depicts the pressure vessel of FIG. 1 upon being sealed in accordance with the present invention.
Figure 4:
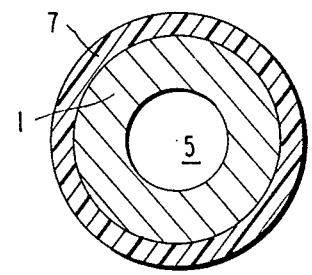
FIG. 4 is a cross-sectional view of the pressure vessel of FIG. 3, shown on the line 4—4 of FIG. 3.

Irrespective of whether the material employed to seal the joint is heat or air-shrinkable, the material upon shrinking preferably covers the entire outer circumferential surface of the end cap 3, and most perferably curls about the end of the end cap to ensure the proper positioning of the end cap during use as shown in FIGS. 2 and 3.

Figure 5:
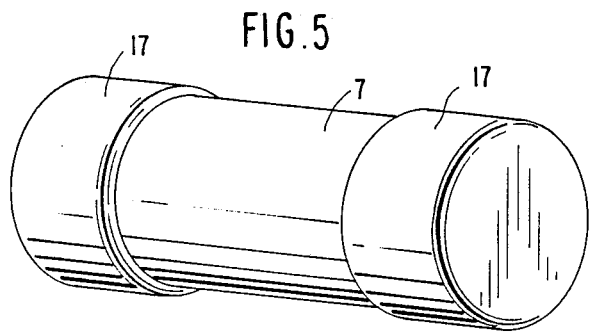
FIG. 5 is a view in perspective of a second embodiment of the pressure vessel of the present invention.
Figure 6:
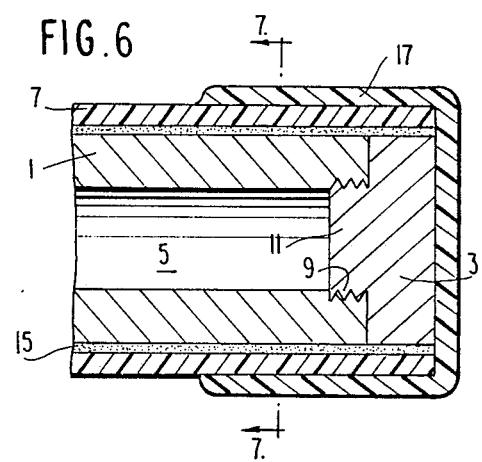
FIG. 6 is a view in longitudinal cross-section of the pressure vessel of FIG. 5.
Figure 7:
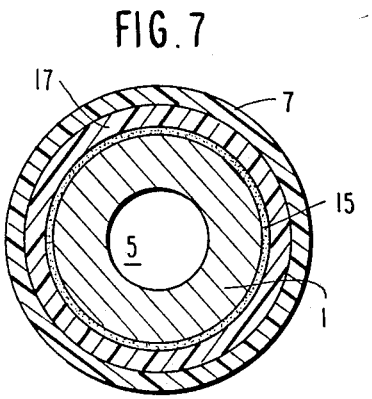
FIG. 7 is a cross-sectional view of the pressure vessel of FIG. 6, shown on the line 7—7 of FIG. 6.

It has further been determined that a boot 17 of shrinkable material can be placed with advantage in full encompassing relationship with the end cap while overlapping a portion of the earlier-applied sleeve 7 of shrinkable material, as shown in FIGS. 5–7. The presence of the overlapping boot serves to enhance the protection afforded the pressure vessel (and in particular the end cap) against the corrosive effects of sea water while further assisting in the sealing of the joint and the attachment of the end cap to the pressure vessel.

Figure 8:
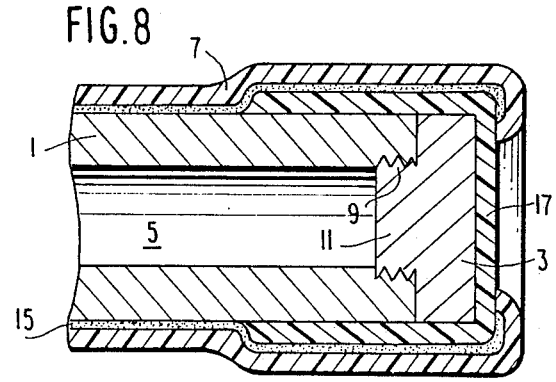
FIG. 8 is a view in longitudinal cross-section of an alternative embodiment of the present invention.

Alternatively, the boot 17 may be placed over the end cap 3 prior to placement of the sleeve 7 about the pressure vessel as depicted in FIG. 8.

The pressure vessel of the present invention may be formed as follows. A cylindrical pressure vessel casing 1 as depicted in FIG. 1 having two open end portions is sealed with end caps 3. In the event that a heat-shrinkable sleeve is to be applied which itself has no inner lining of adhesive, a sleeve of a melt flow adhesive 15 may be placed over the pressure vessel which sleeve extends the entire longitudinal extent of the pressure vessel. Subsequently, a heat-shrinkable sleeve 7 is placed thereover which also covers the entire longitudinal extent of the pressure vessel and extends somewhat beyond each end thereof. Heat is then applied in a conventional manner to the heat-shrinkable sleeve to cause the sleeve to shrink about the pressure vessel while also activating the melt flow adhesive 15. Desirably, the sleeve is heat shrunk from the center of the pressure vessel outwardly toward the ends to assist in the removal of air from between the sleeve and the pressure vessel. Upon achievement of the desired degree of shrinkage, a boot 17 of heat-shrinkable material may optionally be placed over the end of the pressure vessel as shown in FIGS. 5–7 and also caused to shrink about the pressure vessel. Once the boot is caused to shrink about the pressure vessel the pressure vessel may be employed in the manner contemplated.

Similar steps are undertaken with regard to the use of air-shrinkable materials with the exception that instead of heating, the pressure vessel is exposed to air at ambient temperature for a period of time sufficient to achieve the desired corporation of solvent and hence the desired shrinkage prior to use.

What is claimed is:
1. A pressure vessel capable of withstanding elevated external hydrostatic pressures, said pressure vessel comprising a tubular casing capable of withstanding extreme hydrostatic pressures having an internal cavity and an opening in at least one end permitting access to said cavity, an end cap sealing said end opening and defining an external joint between adjacent portions of said closure means and said pressure vessel casing upon sealing of said opening, said end cap having an outer circumferential surface which is flush with an adjacent circumferential surface of said pressure vessel casing, at least a portion of said pressure vessel casing and said end cap being encapsulated by a seamless tubular sleeve of heat or air-shrinkable material which covers the entire circumferential extent of said external joint and is heat or air-shrunk about said portions to seal said external joint.

2. The pressure vessel of claim 1 wherein said pressure vessel casing is cylindrical in configuration and said outer circumferential surface of said end cap is cylindrical and concentric with and of the same diameter as said cylindrical configuration.

3. The pressure vessel of claim 1 wherein said pressure vessel casing includes an opening in each end thereof.

4. The pressure vessel of claim 1 wherein the outer circumferential surface of said end cap is entirely covered by said tubular sleeve.

5. The pressure vessel of claim 1 wherein said portion of said end cap which seals said opening includes a longitudinal extension which extends into and is seated in said opening.

6. The pressure vessel of claim 1 wherein said tubular sleeve is comprised of a heat-shrinkable synthetic resin material.

7. The pressure vessel of claim 6 wherein said material comprises an irradiation cross-linked polyolefin.

8. The pressure vessel of claim 1 wherein said heat or air-shrinkable material is in the form of a tubular sleeve which extends the entire longitudinal extent of said pressure vessel.

9. The pressure vessel of claim 8 wherein said pressure vessel casing is comprised of a fiber/resin composite.

10. The pressure vessel of claim 1 further including a layer of heat or air-shrinkable material in the form of a boot covering said entire end cap and an adjacent portion of said pressure vessel casing, said boot being heat or air-shrunk about said pressure vessel casing and said sleeve being heat or air-shrunk about said pressure vessel casing and said boot.

11. The pressure vessel of claim 1 wherein said pressure vessel is capable of withstanding external hydrostatic pressures of up to 18,000 psi.

12. The pressure vessel of claim 1 wherein said end cap is threadedly attached to said pressure vessel casing.

13. The pressure vessel of claim 1 wherein said heat or air-shrinkable material is comprised of an air-shrinkable material.

14. The pressure vessel of claim 1 further including an adhesive layer between said heat or air-shrinkable material and said pressure vessel casing.

15. The pressure vessel of claim 14 wherein said adhesive comprises a hot melt adhesive.

16. The pressure vessel of claim 1 further including a layer of mastic sealant between said heat or air-shrinkable material and said pressure vessel casing.

17. The pressure vessel of claim 1 further including a layer of heat or air-shrinkable material in the form of a boot covering said entire end cap and an adjacent portion of said pressure vessel casing, said boot overlying said tubular sleeve and being heat or air-shrunk about said sleeve.

18. The pressure vessel of claim 1 wherein said pressure vessel casing is comprised of a material selected from the group consisting of aluminum, stainless steel and titanium.

* * * * *